United States Patent [19]
Minushkin et al.

[11] 3,711,394
[45] Jan. 16, 1973

[54] CONTINUOUS OXYGEN MONITORING OF LIQUID METALS

[75] Inventors: Bertram Minushkin, Smithtown; George Kissel, Bayport; Francis J. Salzano, Patchogue, all of N.Y.

[73] Assignee: The United States of America as represented by the United States Atomic Energy Commission

[22] Filed: Oct. 29, 1970

[21] Appl. No.: 85,002

[52] U.S. Cl..............................................204/195 S
[51] Int. Cl..............................................G01n 27/46
[58] Field of Search..........................204/1 T, 195 S

[56] References Cited

UNITED STATES PATENTS

| | | | |
|---|---|---|---|
| 3,347,767 | 10/1967 | Hickam | 204/195 S |
| 3,454,486 | 7/1969 | Davies | 204/195 S |
| 3,468,780 | 9/1969 | Fischer | 204/195 S |
| 3,481,855 | 12/1969 | Kolodney et al. | 204/195 S |
| 3,578,578 | 5/1971 | Von Krusenstierna | 204/195 S |

*Primary Examiner*—T. Jung
*Attorney*—Roland A. Anderson

[57] ABSTRACT

An electrode assembly for use in measuring the oxygen content of liquid sodium consisting of a solid body of electrolytic material for immersion in the sodium. The active electrode is oxygen or a gas containing oxygen circulated directly in contact with the inner coated surface of the body.

4 Claims, 3 Drawing Figures

PATENTED JAN 16 1973

3,711,394

INVENTORS.
BERTRAM MINUSHKIN
GEORGE KISSEL
FRANCIS J. SALZANO 3,711,394

CONTINUOUS OXYGEN MONITORING OF LIQUID METALS

SOURCE OF THE INVENTION

The invention described herein was made in the course of, or under a contract with the United States Atomic Energy Commission.

BACKGROUND OF THE INVENTION

In sodium cooled nuclear reactors the presence of small amounts of oxygen is a controlling factor in corrosion and mass transfer which affect the life and safety of the reactor, as is well known in the art. Certain materials considered to be otherwise quite suitable for specific applications in a nuclear reactor, stainless steel and columbium, for example, are readily corroded by the oxygen in solution, even in very small amounts, such as a few p.p.m. of the oxygen.

While considerable precautions are generally taken to insure that the presence of oxygen will be kept to the barest possible minimum, it is quite apparent that during normal operation of the reactor, regular tests for the presence of oxygen should be made to insure that the level of oxygen will not increase unexpectedly to unsafe values. Furthermore, a sudden, though slight, increase in oxygen might be the first detectable indication of a failure or otherwise undetected deviation from normal operation and it would be exceedingly helpful if this increase were to be detected immediately so that corrective action can be taken before extensive damage occurs.

As a result of such need, a variety of techniques and devices have been developed over the years to measure the amount of oxygen dissolved in liquid metals. The so-called "plugging meter" which relies on cooling of a by-pass stream to precipitate out the sodium oxide to cause plugging of a flow restriction is not a specific measuring device and not accurate to less than 10 p.p.m. of oxygen and quite often not even sensitive below 25 p.p.m. of the oxygen. Also, other impurities tend to interfere with the results of this method. A resistivity meter has been proposed in which slight variations of oxygen concentration will cause detectable changes in the resistivity of the liquid metal, but other impurities have been found to affect the results and furthermore the results have not been found to be reproducible. Techniques based on the oxidation of uranium or the equilibration of vanadium with oxygen in the sodium have been suggested but as presently conceived they can be used only intermittently and require considerable time to obtain acceptable results for a particular sample.

It has been proposed that the principle of a galvanic cell be utilized as a means of obtaining a continuously measuring and instantly reading device of the desired accuracy and range. A system incorporating a galvanic cell would have the unique advantage, in theory at least, of increasing in accuracy with decreasing concentration of the oxygen impurity.

One such device, described in U.S. Pat. No. 3,378,478, issued on Apr. 16, 1968, produces an emf which indicates directly the amount of oxygen present in the sodium. The patented device utilizes metal-metal oxides reference electrodes.

A number of significant operational difficulties in the use of the galvanic cell referred to above, however, have developed. These are the short life due to attack of the $ZrO_2$—CaO by sodium, ambient temperature effect, changes in calibration with time or when the meter temperature is changed. Considerable efforts have been expended to overcome these difficulties, and one such improvement is shown in U.S. Pat. No. 3,481,855, issued on Dec. 2, 1969. Of particular interest is the embodiment therein described utilizing a so-called gaseous electrode. While potentially of great usefulness the gaseous electrode configuration on a practical level is largely useless due to build-up of impurities in the confined gaseous electrode, variation of oxygen content over period of use, and deterioration of the electrical contact with consequence of poor, non-uniform results, and degradation of the cell's performance after a period of use.

SUMMARY OF THE INVENTION

The present invention overcomes or reduces the aforementioned problems associated with the gaseous electrode used in the galvanic cell oxygen meter. It has been discovered that the operational difficulties described above can be overcome by making certain improvements in the electrode assembly design.

In accordance with the principles of this invention it has been found that a press type contact for the wire lead, away from the hottest portion of the assembly, produces a very much improved, effective and efficient cell, while a circulating gas electrode avoids many of the operational difficulties found to exist in the electrode structure previously used.

It is thus a principal object of this invention to provide an improved way of monitoring a liquid alkali metal for oxygen content.

Other objects and advantages of this invention will hereinafter become obvious from the following description of a preferred embodiment of this invention.

DESCRIPTION OF THE PREFERRED EMBODIMENTS

Figure 1:
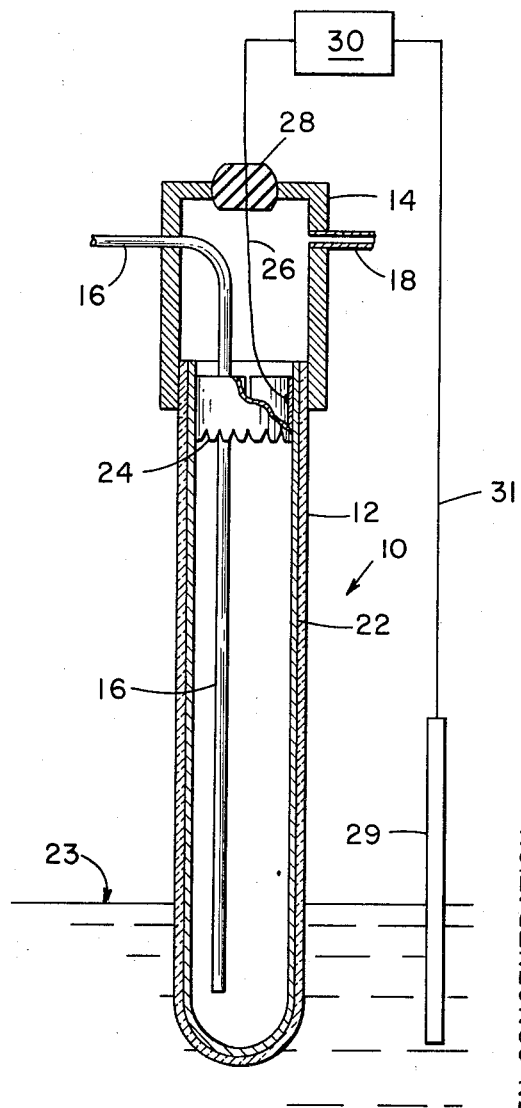
FIG. 1 is an elevation view in section of a preferred configuration incorporating the principles of this invention.

Referring to FIG. 1, electrode assembly 10 consists of a solid ceramic tube 12, which is closed at the bottom and open at the top, having a housing 14 enclosing and sealing the top thereof. Tube 16 passes through the wall of housing 14 to supply oxygen containing gas to assembly 10 at a point in the lower region of tube 12. This maintains a uniform composition of the reference gas, prevents build-up of impurities, and prevents depletion of the oxygen. Vent tube 18 carries away the exhausting gas. The flow of gas may be reversed, entering tube 18, flowing down, and exhausting through tube 16.

Tube 12, which is immersed in liquid sodium 23 whose oxygen content is to be measured, is coated along its inner surface with a porous metallic coating 22 as will be described further below. A cylindrical spring 24 made of or plated with the same material as the coating is mounted within the upper portion of tube 12, spring 24 expanding to make spring contact, a firm, low resistance electrical contact, with coating 22. An electrical wire 26, preferably of stainless steel is spot welded to the inside of spring 24 and extends out through the top of housing 14, passing through electrical insulator 28. The galvanic cell of which assembly 10 is a part is completed by an electrode 29 of relatively inert metal acting as a conductor immersed in sodium 23, or the metal container of the sodium may be used, electrometer 30 to measure the emf generated, and conductor 31 to complete the circuit.

Figure 2:
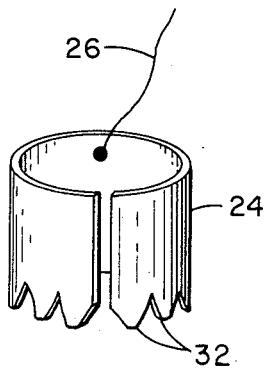
FIG. 2 shows an isometric view of the spring used to establish electrical contact with the porous layer.

FIG. 2 shows the details of a typical design for spring 24, being cylindrical in shape and squeezed radially before inserting into tube 12 so that its expansion will hold it in place. Legs 32 which may be bent along at least one edge improve the gripping characteristics of spring 24. Spring 24 is made typically of bronze and is plated with the same material as coating 22 to provide adequate electrical connection.

The use of spring 24, to make the electrical connection with porous layer 22, and its location adjacent the upper portion of ceramic tube 12 is an important aspect of this invention. From theoretical considerations it would ordinarily be desirable to make the connection at the bottom of tube 12, more closely adjacent to the liquid sodium and directly opposite the inert electrode, and to weld the lead directly to the porous coating. However, it has been discovered that due to the thermal gradient along tube 12, that a pressure type connection of the type described located remote from the liquid sodium produces an instrument which is more rugged, has greater reliability, and longer life.

For use as the porous coating or layer 22 any metal in which oxygen will dissolve but with which it will not react may be employed. In the particular embodiment described and the examples which follow, either gold or platinum was successfully employed.

The ceramic material employed for tube 12 is a solid electrolyte made from a metallic oxide material that has a crystal structure containing oxygen ion vacancies such that the material conducts electricity predominantly by the migration or transfer of oxygen ions through the crystalline structure of the materials. Materials of this type and suitable for this invention are known in the art and are more particularly identified in the aforementioned U.S. Pat. No. 3,481,855. In the particular embodiment described herein and the examples which follow, the electrolytic ceramic material used was $ThO_2$ with a minor amount of $Y_2O_3$, for example 15 $w/o$ $Y_2O_3$.

Deposition layer 22 of gold is accomplished by first brushing on a commercially available metallo-organic compound of the gold dissolved in an organic solvent such as toluene, turpentine, etc. These solutions, which are well known in the art, are described in the article, "How to Apply Noble Metals to Ceramics," by Ralph T. Hopper, Ceramics Industry, June 1963.

Excess solution is brushed away from the surface of tube 12 and the latter is rotated on its axis as air is gently sucked through the interior, evaporating the organic solvent. Circulation of the air can be accomplished by inserting into tube 12 as it rotates the suction pipe to an air pump thereby bringing fresh air into contact with the drying layer. The drying process takes several hours. Removal of excess solution produces a coating thickness of about 0.1 micron which has been found to be optimum. Tube 12 is then heated in an oven slowly to a temperature at which the organic residue and the metallic compound decompose leaving a thin porous film of the metal. For deposition of platinum a similar process is used.

Figure 3:
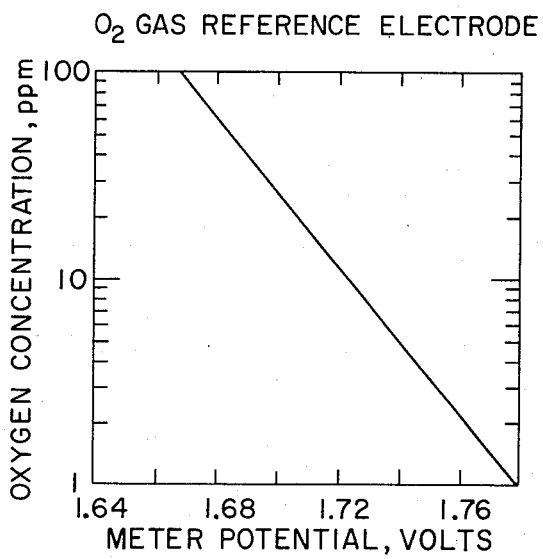
FIG. 3 illustrates a typical calibration graph for a cell incorporating the principles of this invention.

The arrangement described for electrode assembly 10 has proven to be an effective and reliable construction for use in measuring the oxygen content of liquid sodium. The graph in FIG. 3 shows a typical calibration curve for an instrument of this type. In the assembly from which the curve in FIG. 3 was taken, tube 12 was 8 inches long, had an O.D. of ½ inch and I.D. of ⅜ inch, and the porous layer of 0.1 micron thickness was gold. The electrolytic material was $ThO_2$ — 15 $w/o$ $Y_2O_3$. The temperature of the sodium was about 400° C.

It is thus seen that there has been provided an improved arrangement for the continuous measurement of oxygen present in a system of liquid sodium.

We claim:

1. An electrode assembly for use in a cell for the detection of oxygen dissolved in liquid sodium comprising:
   a. an elongated hollow body closed at the bottom thereof and made from $ThO_2$ containing a minor amount of $Y_2O_3$ for partial immersion of the closed portion within said liquid sodium, said body filled with oxygen containing gas;
   b. a porous coating of metal covering the inner surface of said hollow body;
   c. contact means consisting of a cylindrical spring member of electrically conducting material in spring contact with a coated portion of said body adjacent the top thereof; and
   d. electrical lead means extending from said contact means out of said body.

2. The assembly of claim 1 in which the material of said contact means is the same as the coating material.

3. The assembly of claim 2 having means to circulate fresh oxygen containing gas within said body thereby maintaining the oxygen content of said gas and preventing build-up of impurities.

4. The assembly of claim 3 in which the material of said coating is selected from the group consisting of gold and platinum.

* * * * *